US006511327B1

(12) United States Patent
Kerr et al.

(10) Patent No.: US 6,511,327 B1
(45) Date of Patent: Jan. 28, 2003

(54) SIMPLIFIED NETWORK INTERFACE DEVICE

(75) Inventors: David Stevens Kerr, Morris Plains, NJ (US); Jason A. Kay, Morristown, NJ (US); Douglas Lewis Cowan, Snellville, GA (US); Anthony Joseph David, Omaha, NE (US); Ivan Pawlenko, Holland, PA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/434,173

(22) Filed: Nov. 5, 1999

Related U.S. Application Data

(63) Continuation-in-part of application No. 08/939,747, filed on Sep. 27, 1997, now Pat. No. 6,322,375.

(51) Int. Cl.[7] ........................................ H04M 1/00

(52) U.S. Cl. ........................ 439/55; 379/399; 439/715; 439/922; 439/951; 439/932

(58) Field of Search ........................ 439/55, 78, 951, 439/850, 79, 80, 797, 922, 715, 932; 379/399; 361/119

(56) References Cited

U.S. PATENT DOCUMENTS 2,980,878 A * 4/1961 Swengel
3,611,249 A * 10/1971 Lovrenich
4,317,154 A * 2/1982 Passarella
4,395,081 A * 7/1983 Melys
4,629,281 A * 12/1986 Kruger
4,981,438 A * 1/1991 Bekhiet ..................... 439/76.1
5,507,668 A * 4/1996 Lambrinos .................. 439/502
5,812,357 A * 9/1998 Johansen et al. ........... 361/212
5,899,759 A * 5/1999 Yeow et al. .................. 439/79
5,901,220 A * 5/1999 Garver ........................ 379/399
5,903,973 A * 5/1999 Nelson .................. 174/DIG. 8
6,123,550 A * 9/2000 Burkert et al. ................ 439/63

* cited by examiner

*Primary Examiner*—Neil Abrams
(74) *Attorney, Agent, or Firm*—Birch, Stewart, Kolasch & Birch, LLP

(57) ABSTRACT

A network interface system or device is disclosed that represents an optimal balance in the cost of the materials for the components and the cost of the assembly time required of a field technician. One or more lines from the network provider, e.g., a telephone company, are provided as well as one or more corresponding lines from a customer. For a given network line and corresponding customer line, each line is preferably terminated with a female spade connector. A small printed circuit board (PCB) is provided that has ends shaped to act as male spade connectors. An electrical connection is provided between the ends of the PCB. Optionally, but preferably, a gas tube is provided to suppress surges on the network line before they damage equipment connected to the customer line. A PCB configured in this manner can connect one set or multiple sets of lines.

16 Claims, 6 Drawing Sheets

SIMPLIFIED NETWORK INTERFACE DEVICE

This application is a continuation-in-part of application Ser. No. 08/939,747, filed on Sep. 27, 1997, entitled "Network Interface Device With Circuit Board Architecture," now U.S. Pat. No. 6,322,375, the entire contents of which are hereby incorporated by reference.

FIELD OF THE INVENTION

The invention is generally directed toward the field of wire-to-wire connectors, and more particularly, to the field of network interface devices, and even more particularly, to the field of network interface devices between telephone company signal lines and customer signal lines.

BACKGROUND OF THE INVENTION

A customer subscribing to networked services, e.g., from a telephone company, typically owns a portion of the equipment over which the signals are transmitted. It has become a requirement that a point of demarcation be set between the equipment owned by the network provider, e.g., a telephone company, and the equipment owned by the customer. Typically, this point of demarcation takes the form of a network interface device (NID) located immediately outside the customer's building.

At the NID, signal lines from the networked provider are connected to signal lines from the customer. An example of a simple background art NID is a surge suppressor, typically in the form of a gas tube, that is encapsulated in plastic and provided with binding posts or screw terminals by which connections to the customer's line, the telephone company's, or network line and a ground connection are made.

Another type of network interface device (NID) is the subject of U.S. Pat. No. 6,322,375 by some of the Inventors of the present application. There, a device is disclosed that uses a printed circuit board (PCB) with multiple connector types. The network lines and the customer lines are preferably connected to the PCB by way of insulation displacement connectors (IDCs) that are located at points on the interior of the board. In an IDC, the wire is inserted between two blades that cut through the insulation and grip the wire with a strong force. Some IDCs provide a gas-tight connection.

The multiple connector types on the PCB of the U.S. Pat. No. 6,322,375 permit a service technician to easily perform a variety of diagnostic tests. The provision of the IDCs permits the network line and the customer line to be connected very quickly to the PCB.

The speed at which connections can be made to the NID of the copending application is a great advantage. In the telecommunications market, it is extremely important to provide equipment that minimizes the time spent by a technician in the field. The IDCs save a great deal of time because they free the service technician from having to strip insulation from the ends of the network line and the customer line, (possibly) attach a connector to those lines, and then mechanically couple the lines to corresponding connectors on the NID. Unfortunately, the cost of the IDCs is very significant, which commensurately raises the cost of the NID.

SUMMARY OF THE INVENTION

An advantage of the invention is that it provides a very inexpensive, and relatively quick to assemble in the field, network interface connection technology.

The invention, in part, represents a recognition that a simplified network interface device (NID), that requires more manual installation steps than, e.g., the IDCs of the NID according to the copending application, can achieve significantly reduced overall costs.

The invention, in part, provides a network interface system comprising: a network signal line and a printed circuit board (PCB). Such a PCB has at least a first connector and a second connector by which an electrical and mechanical connection is made to said network signal line and another signal line, e.g., a user or customer signal line. Such a printed circuit board also provides an electrical connection between said first connector device and said second connector device.

The invention also provides, in part, a printed circuit board (PCB) in a network interface system. Such a printed circuit board comprises: a non-conductive substrate; wherein said printed circuit board includes at least a first projection and a second projection configured to dimensions of a male spade connector; and at least a first conductive layer extending from said first projection and a second conductive layer extending from said second projection such that female spade connectors mechanically connected to said first projection and said second projection are also electrically connected to said first and second conductive layers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only (it is noted that the drawings are not drawn to scale), and thus are not limitative of the present invention, and wherein.

DETAILED DESCRIPTION OF THE PREFERRED EMBODIMENTS

Figure 1A:
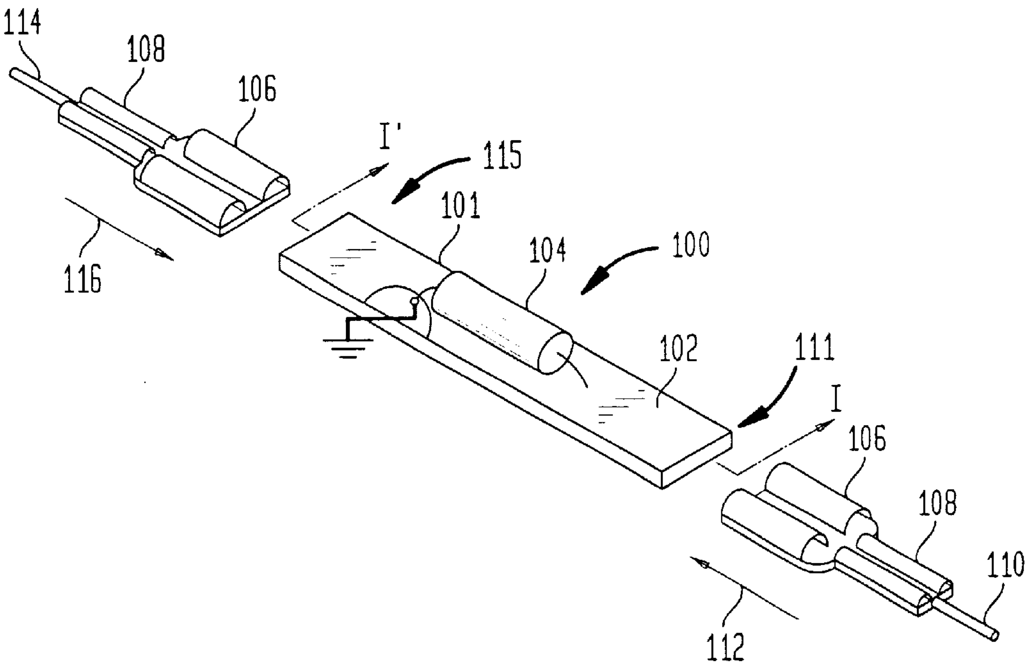
FIG. 1A depicts an exploded view of a first embodiment of the network interface system according to the invention.

FIG. 1A is an exploded view of a first embodiment 100 of a network interface system or device according to the invention. The network interface device (NID) 100 includes a printed circuit board (PCB) 101 and connectors or terminals 106. One of the terminals 106 is connected to a wire 110 from the network provider, e.g., the telephone company. The other terminal 106 is connected to another wire 114, e.g., from a customer.

The connectors 106 are preferably low in cost and of a design that requires relatively little manual assembly to attach to the respective wires 110 and 114. A preferred embodiment of the terminals 106, as depicted in FIG. 1A, is the female configuration of the well-known spade terminal. The spade terminals 106 are mechanically and electrically attached to the wires 110 and 114 via a crimp 108.

A conductive layer or wire run 102 is formed on the surface of the PCB 101 and establishes an electrical connection between opposite ends 111 and 115 of the PCB 101. This aspect is more easily observed in the cross-sectional view of FIG. 1C, which corresponds to the view line I–I' of FIG. 1A.

The PCB 101 is preferably small. But it is sufficient in size to accommodate the optional, but preferred, surge suppressor 104. The surge suppressor 104 in FIG. 1A takes the form of the well-known gas tube. An alternative to the gas tube surge suppressor would be a solid state over-voltage and/or over-current protector device. One lead of the gas tube 104 is connected to the wire run 102 while the other lead is connected to ground.

The widths and thickness of the ends 111 and 115 of the PCB 101 have been selected so that they act as the male counterparts to the female spade connectors 106. The NID 100 is assembled by attaching the connectors 106 to the wires 110 and 114, and then pushing the female spade connectors 106 onto the male ends 111 and 115 of the PCB 101.

Figure 1B:
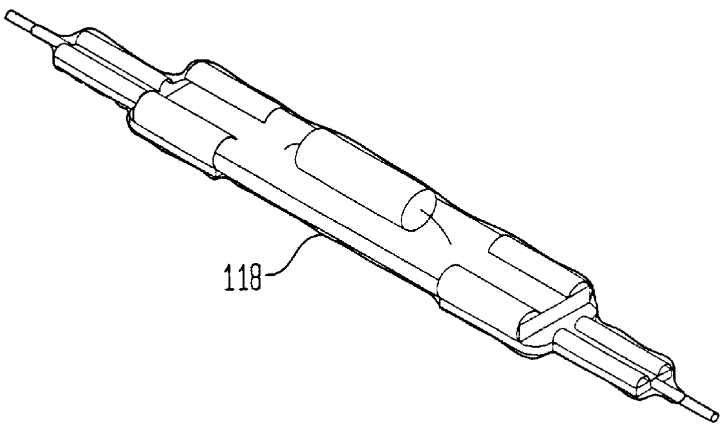
FIG. 1B depicts an optional weather-resistant enclosure around the embodiment of FIG. 1A.
Figure 1C:
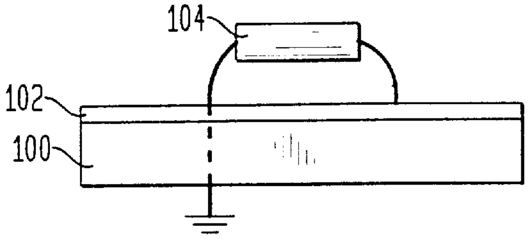
FIG. 1C depicts a cross section along the line I–I' of FIG. 1A.

FIG. 1B depicts a non-exploded view of the NID 100 of FIG. 1A with the addition of a weather resistant and/or electrically insulating covering 118 that encloses the NID 100. A preferred embodiment of the covering 118 is heat shrink tubing that can be applied to the NID 100 and shrunk to fit by a field technician after assembly of the NID 100.

In environments that promote corrosion of metal components, a weather resistant covering 118 has the advantage of retarding corrosion, which extends the usable lifetime of the NID 100. Some harsh weather environments include installations near the coast, especially near salt water, as well as installations that are intended to be submerged or that face the intermittent problem of submersion due to flooding.

Also, the covering 118 can be selected to act as a dielectric that can insulate the NID 100 from adjacent network interface devices. This has the advantage of preventing a short-circuit between adjacent NID's that might occur by incidental contact of otherwise uninsulated metal connections.

Figure 2A:
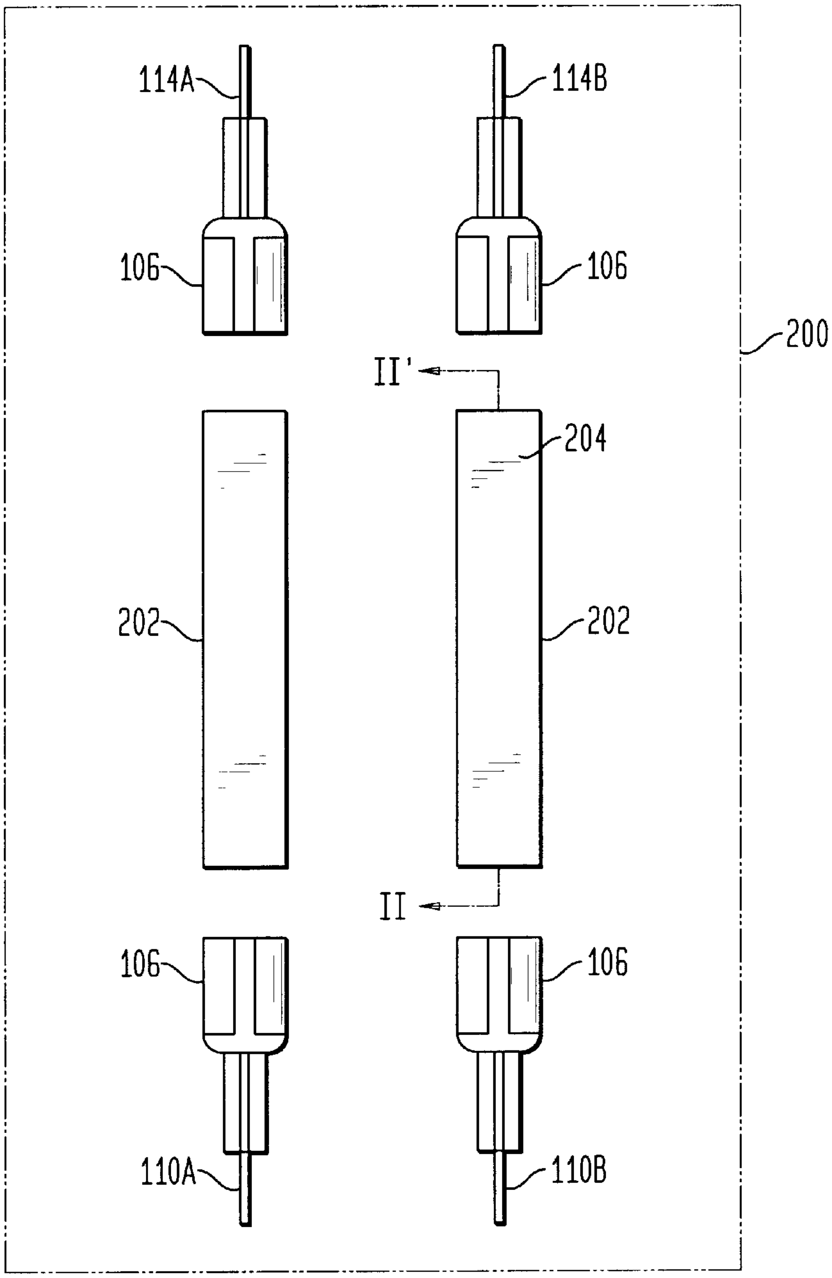
FIG. 2A depicts a second embodiment of the network interface system according to the invention.
Figure 2B:
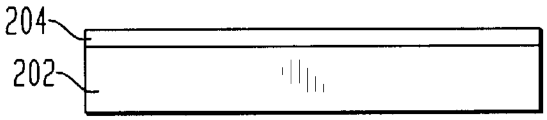
FIG. 2B depicts a cross section of the printed circuit board (PCB) of FIG. 2A taken along the view line II–II'.

FIG. 2A is an exploded schematic view of a second embodiment of the network interface system or device according to the invention. Differences relative to FIG. 1A will be emphasized. In FIG. 2A, a conductive layer 204 covers an entire surface of the PCB 202. Unlike the PCB 101 of FIG. 1A, the PCB 202 is not provided with a surge suppressor device. Some regions are not required by the government to have a surge suppressor incorporated into the NID.

Also in FIG. 2A, two lines 110A and 110B from the network provider are depicted as well as two lines 114A and 114B from the customer. The lines 110A and 114A together represent the tip wire, while the lines 110B and 114B together represent the ring wire. Typically, the provision of telephone service requires the use of a tip wire and a ring wire to establish a single telephone line.

A network interface device (NID) enclosure 200 is depicted as a housing for the tip NID and the ring NID. The weather resistant and/or dielectric cover 118 of FIG. 1B is an undepicted option for each of the tip NID and the ring NID of FIG. 2A.

Figure 3A:
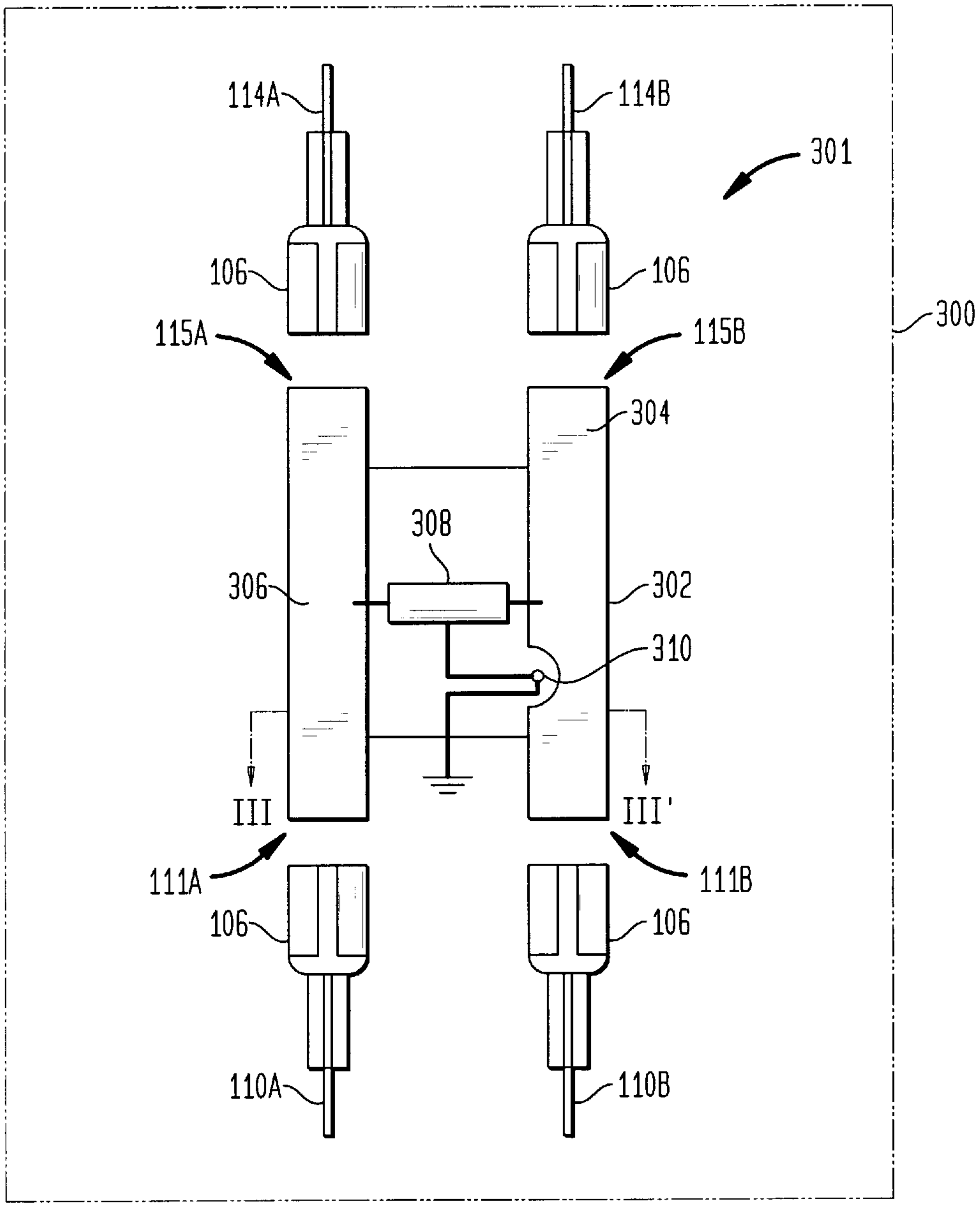
FIG. 3A depicts a third embodiment of the network interface system according to the invention.

FIG. 3A is an exploded, schematic depiction of a third embodiment of the network interface system or device according to the invention. Differences relative to FIGS. 1A and 2A will be emphasized. Rather than the separate PCB's 202 of FIG. 2A, FIG. 3A depicts a single PCB 302 that is used to connect the tip wires 110A and 114A as well as the ring wires 110B and 114B.

The PCB 302 has a shape resembling the letter "H." This results from having provided ends 111A, 111B, 115A, and 115B that are dimensioned so as to define a male counterpart to the female spade terminals 106. Two wire runs 304 and 306 are formed on the surface of the PCB 302. The wire run 304 provides an electrical connection between the ends 111B and 115B, while the wire run 306 provides and electrical connection between the ends 111A and 115A. Because the PCB 324 makes a connection in two lines (here, a tip line and a ring line), it can be regarded as defining a wire pair unit.

The PCB 302 preferably, but not necessarily, includes a surge suppressor device in the form of a well-known three-terminal gas tube. One terminal of the gas tube is connected to the wire run 304, while the second terminal is connected to the wire run 306. The third terminal is connected to a ground stud 310, which is itself connected to ground, or another wire run (not depicted) that is connected to ground.

Figure 3B:
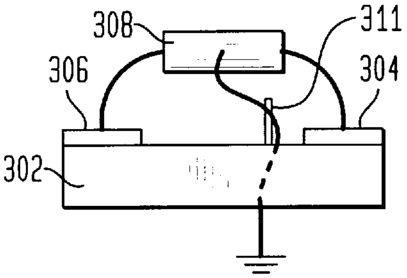
FIG. 3B depicts a side view of the embodiment of FIG. 3A taken along the view line III–III'.

FIG. 3B is a cross-sectional view of the third embodiment of FIG. 3A taken along the view line III–III'. It is noted that the weather resistant and/or dielectric covering 118 is an undepicted option that can be added to the NID 301 within the NID enclosure 300 of FIG. 3A.

Figure 4:
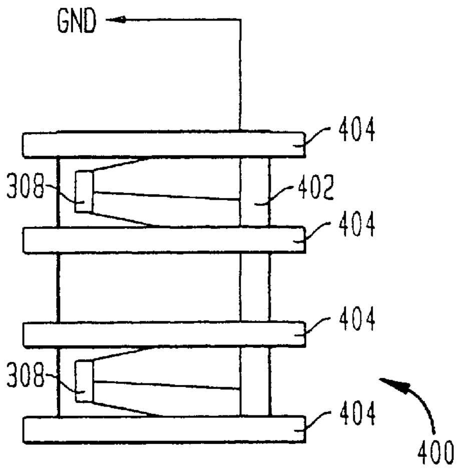
FIG. 4 depicts a printed circuit board (PCB) of a fourth embodiment of the network interface system according to the invention.

FIG. 4 depicts a fourth embodiment of a printed circuit board (PCB) 400 that forms the basis of a fourth embodiment of the network interface system or device according to the invention. The PCB 400 has a dielectric substrate 402. Four wire runs 404 that correspond to two pairs of tip and ring lines are formed on the substrate 402. The PCB 400 can be regarded as having two wire pair units.

Each pair of tip and ring wire runs 404 is connected to a surge suppressor device 308 in FIG. 4. The surge suppressor devices are commonly connected to a ground line.

Any number of lines can be accommodated on the PCB that forms the basis of a network interface system or device according to the invention. When the network is a telephone network, as mentioned previously, the minimum number of wires is typically two. Also, additional wires are typically provided in multiples of two.

Figure 5:
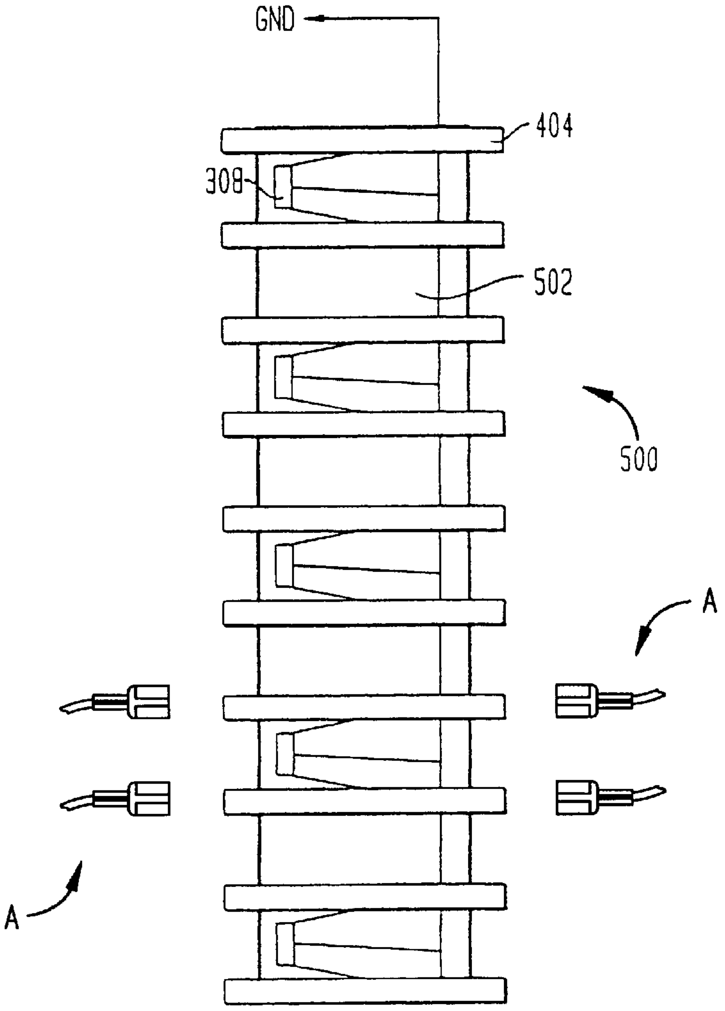
FIG. 5 depicts a fifth embodiment of a printed circuit board (PCB) of a fifth embodiment of the network interface system according to the invention.
Figure 6:
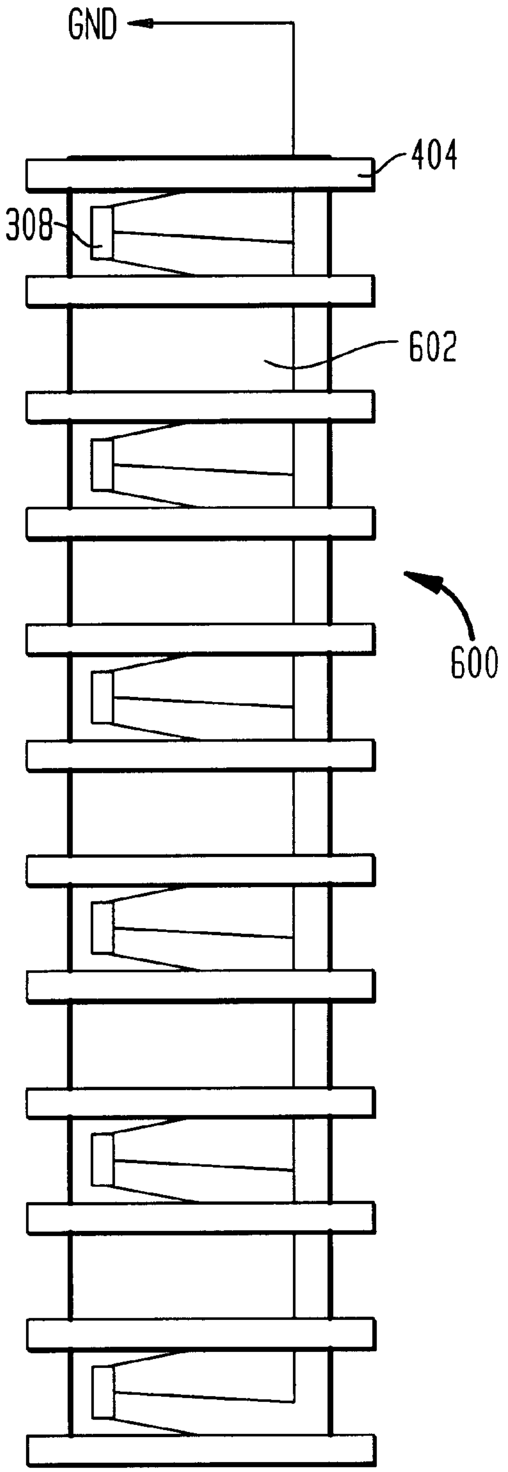
FIG. 6 depicts a printed circuit board (PCB) of a sixth embodiment of the network interface system according to the invention.

As noted previously, FIG. 4 depicts the PCB 400 as having two wire pair units. Similarly, FIG. 5 depicts five wire pair units on the PCB 500 having a dielectric substrate 502 and ten wire runs 404. One pair of lines A is illustrated. Five pairs of lines are typically provided in Brazil, for example. FIG. 6 depicts a six wire pair units on the PCB 600 having a dielectric substrate 602 that includes twelve wire runs 404. Six pairs of lines are commonly provided in the U.S.A., for example.

Figure 10:
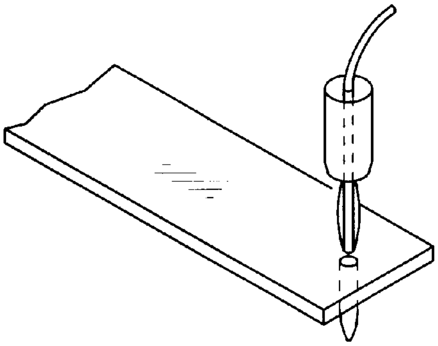

The connectors or terminals 106 have been described as preferably being female spade connectors. This is preferred because the PCB according to the invention can be configured to act as the corresponding male counterpart without the need to attach separate male counterpart connectors to the PCB. But other connectors can be chosen. Instead of spade connectors 106, banana pin connectors can be employed, e.g., as depicted in FIG. 10. A male counterpart banana plug would be fitted to the wires while a corresponding solder plate hole, or socket, or receptacle would be provided on the PCB. Or, the PCB could be configured as a cylinder so as to define a male banana plug component and the wires could be terminated in female banana plug counterparts.

Figure 7A:
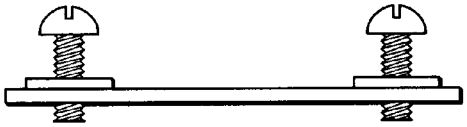
FIGS. 7A, 7B, 7C, 8A, 8B, 8C, 9 and 10 depict views of seventh, eighth and ninth embodiments of the network system according to the invention.
Figure 8A:
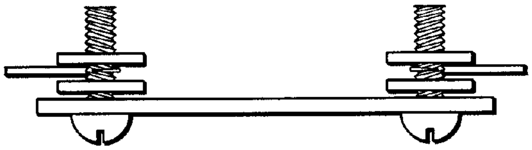
Figure 7B:
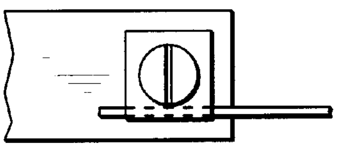
Figure 8B:
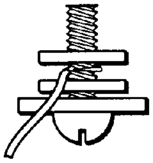
Figure 7C:
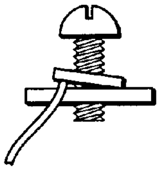
Figure 8C:
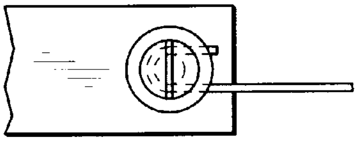
Figure 9:
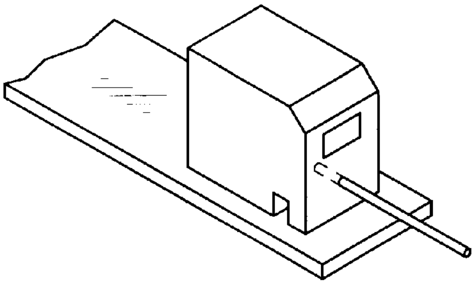

Further alternatives are to forego the use of connectors or terminals 106 and instead use screw terminals (as in FIGS. 7A, 7B and 7C), or binding posts (as in FIGS. 8A, 8B and 8C), or spring-loaded connection units (as in FIG. 9) mounted on the PCB. Bare ends of the wires from the customer and the network are inserted into the spring-loaded connection units.

Yet, another alternative (not depicted) is to use a combination of a female spade terminal and an insulation displacement connector (IDC). The female spade portion of this alternative would be used to connect to the ends of the PCB in the same manner as, for example, the terminals 106 of FIGS. 1A and 2A. The IDC portion of this alternative would be used to more quickly be able to connect to the wires from the customer and the network provider to the spade terminals. The IDC portions would replace the need to manually crimp the spade connector to the wire, but would increase cost.

As an alternative to the heat shrink tubing, weather resistant tape or a weather resistant curing polymer gel could be used. The material selected for the weather resistant and/or dielectric cover 118 will represent a balance of the competing factors of cost, assembly time for the field technician, weather resistance and/or resistivity.

The network interface system or device to the invention can also be provided with filters, and/or test access ports such as an RG-11 connector.

The PCBs 302, 400, 500 and 600 have been depicted as having wire runs that connect corresponding male-spade-connector-configured ends together. An alternative is to not connect all of these ends together. Rather, at least some of these ends can have a wire run that leads to a component on the board.

An advantage of the network interface system or device according to the invention is that a customer can initially be provided with the simple PCB 202 of FIG. 2A and later easily upgrade to a surge suppressing PCB such as PCB 101 of FIG. 1A. Or, as additional lines are provided from the network provider, the PCB 102 or PCB 202 or PCB 302 could be replaced by the PCBs 400, 500, or 600.

Again, an advantage of the network interface system or device according to the invention is that it is low in cost, both in terms of the components as well as the cost represented by the time consumed by a field technician while assembling these devices.

Another advantage of the network interface system or device according to the invention is that the lines from the customer and the network are physically separated at their point of connection either by the covering or by the spacing inherent to the PCBs 302, 400, 500 or 600. This lessons the problem of cross-talk.

Another advantage of the network interface system or device according to the invention is that a variety of different gauges of wire can be easily connected to the same network interface device using the same types of connectors or terminals, e.g., 106. This confers the further advantage of an economy of scale.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A network interface device for connecting at least one network signal line to at least one receiving signal line, said network interface device comprising:

- a printed circuit board having opposed generally planar surfaces;
- a first end of said printed circuit board forming a first male connector;
- a second end of said printed circuit board forming a second male connector;
- a first electrical connecting path formed across one of said opposed generally planar surfaces and connecting said first male connector to said second male connector;
- a first female connector for attachment to a first network signal line; and
- a second female connector for attachment to a first receiving signal line, wherein said first female connector is attached to said first male connector so as to surround a portion of one of said opposed generally planar surfaces of said printed circuit board and make electrical contact with said first electrical connecting path, and said second female connector is attached to said second male connector so as to surround a portion of one of said opposed generally planar surfaces of said printed circuit board and make electrical contact with said first electrical connecting path, wherein said printed circuit board has a rectangular perimeter, and said first end of said printed circuit board includes one side of said rectangular perimeter and said second end includes the opposite side of said rectangular perimeter, wherein said first and second female connectors are spade-type connectors.

2. The network interface device according to claim 1, further comprising:

- a surge suppressor electrically connected to said first electrical connecting path connecting said first male connector to said second male connector.

3. The network interface device according to claim 2, wherein said surge suppressor is also electrically connected to a ground.

4. The network interface device according to claim 2, wherein said surge suppressor is a gas tube.

5. The network interface device according to claim 2, wherein said surge suppressor is mounted on said printed circuit board.

6. The network interface device according to claim 1, further comprising:

- a weather-resistant sealant enclosing said printed circuit board, said first and second male connectors, and said first and second female connectors.

7. The network interface device according to claim 6, wherein said weather-resistant sealant is one of heat-shrink tubing or tape.

8. The network interface device according to claim 1, wherein said printed circuit board is a first printed circuit board, and further comprising:

a second printed circuit board having opposed generally planar surfaces;

a first end of said second printed circuit board forming a third male connector;

a second end of said second printed circuit board forming a fourth male connector;

a second electrical connecting path formed across one of said opposed generally planar surfaces and connecting said third male connector to said fourth male connector;

a third female connector for attachment to a second network signal line; and a fourth female connector for attachment to a second receiving signal line, wherein said third female connector is attached to said third male connector so as to surround a portion of one of said opposed generally planar surfaces of said second printed circuit board and make electrical contact with said second electrical connecting path, and said fourth female connector is attached to said fourth male connector so as to surround a portion of one of said opposed generally planar surfaces of said second printed circuit board and make electrical contact with said second electrical connecting path.

9. The network interface device according to claim 8, further comprising:

a housing for supporting and enclosing said first and second printed circuit boards.

10. The network interface device according to claim 8, further comprising:

a surge suppressor electrically connected to said first electrical connecting path connecting said first male connector to said second male connector and electrically connected to said second electrical connecting path connecting said third male connector to said fourth male connector.

11. The network interface device according to claim 10, wherein said surge suppressor is also electrically connected to a ground.

12. The network interface device according to claim 10, wherein said surge suppressor is a gas tube.

13. The network interface device according to claim 8, wherein the first and second network signal lines compose a first twisted pair for telephone communications and said first and second printed circuit boards establish a connection between the first twisted pair and the first and second receiving signal lines.

14. The network interface device according to claim 13, further comprising:

third and fourth printed circuit boards for connecting to a second twisted pair; and a housing for supporting and enclosing said first, second, third and fourth printed circuit boards.

15. The network interface device according to claim 14, further comprising:

additional printed circuit boards supported and enclosed by said housing for connecting to third, fourth and fifth twisted wire pairs.

16. The network interface device according to claim 14, further comprising:

additional printed circuit boards supported and enclosed by said housing for connecting to third, fourth, fifth and sixth twisted wire pairs.

* * * * *